US006924798B2

(12) United States Patent
Marshall et al.

(10) Patent No.: US 6,924,798 B2
(45) Date of Patent: Aug. 2, 2005

(54) REAL-TIME MULTI-RESOLUTION SHADOWS

(75) Inventors: Carl S. Marshall, Portland, OR (US); Adam T. Lake, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 472 days.

(21) Appl. No.: 09/863,217

(22) Filed: May 22, 2001

(65) Prior Publication Data

US 2002/0175914 A1 Nov. 28, 2002

(51) Int. Cl.$^7$ .......................... G06T 15/00; G06T 15/50; G06T 17/00
(52) U.S. Cl. ................. 345/419; 345/426; 345/428
(58) Field of Search ................. 345/428, 426, 345/419, 420, 582

(56) References Cited

U.S. PATENT DOCUMENTS

| | | | |
|---|---|---|---|
| 4,600,919 A | 7/1986 | Stern | |
| 5,124,914 A | 6/1992 | Grangeat | |
| 5,163,126 A | 11/1992 | Einkauf et al. | |
| 5,731,819 A | 3/1998 | Gagne et al. | |
| 6,057,859 A | 5/2000 | Handelman et al. | |
| 6,198,486 B1 * | 3/2001 | Junkins et al. | 345/419 |
| 6,208,347 B1 | 3/2001 | Migdal et al. | |
| 6,337,880 B1 | 1/2002 | Cornog et al. | |
| 6,388,670 B2 | 5/2002 | Naka et al. | |

FOREIGN PATENT DOCUMENTS

| | | | |
|---|---|---|---|
| JP | 948978 A2 * | 10/1999 | 345/426 |

OTHER PUBLICATIONS

Harovas et al, MAYA complete 2, 2000, p. 619, Sybex.*
Herndon et al, "Interactive Shadows" Nov. 1992, pp. 1–6, ACM 0–89791–550–X/92/0011/0001.*
Lee et al., "Navigating through Triangle Meshes Implemented as Linear Quadtrees," Computer Science Department, Center for Automation Research, Institute for Advanced Computer Studies, University of Maryland College Park, MD, Apr. 1998.
Lewis "Pose Space Deformation: A Unified Approach to Shape Interpolation and Skeleton–Driven Deformation" Centropolis, New Orleans, LA, 165–172.
Lasseter "Principles of Traditional Animation Applied to 3D Computer Animation" Pixar, San Rafael, California, 1987.
Thomas (Contributor) et al., "The Illusion of Life: Disney Animation" 47–51.
Hoppe, "Progressive Meshes" Microsoft Research, 99–108, http://www.research.microsft.com/research/graphics/hoppe/.
Popovic et al., "Progressive Simplicial Complexes" Microsoft Research, http:www.research.microsft.com/~hoppe/.
Hoppe "Efficient Implementation of progressive meshes" Coput. & Graphics vol. 22, No. 1, pp. 27–36, 1998.

(Continued)

*Primary Examiner*—Sumati Lefkowitz
*Assistant Examiner*—Scott Wallace
(74) *Attorney, Agent, or Firm*—Sharmini N. Green

(57) ABSTRACT

A shadow is generated in a virtual three-dimensional space by adjusting a resolution of a 3D model, projecting elements of the 3D model onto a surface in the virtual 3D space, and rendering a shadow having the adjusted resolution of the 3D model on the surface using the projected elements.

27 Claims, 7 Drawing Sheets

OTHER PUBLICATIONS

Taubin et al., "Progressive Forest Split Compression" IBM T.J. Watson Research Center. Yorktown Heights, NY.

Cohen–Or et al., "Progressive Compression of Arbitrary Triangular Meshes" Computer Science Department, School of Mathematical Sciences, Tel Aviv, Isreal.

Bajaj et al., "Progressive Compression and Transmission of Arbitrary Triangular Meshes" Department of Computer Sciences, University of Texas at Austin, Austin, TX.

Pajarola et al., "Compressed Progressive Meshes" Graphics, Visualization & Usability Center, College of Computing, Georgia Institute of Technology, Jan. 1999.

Alliez et al., "Progressive Compression for Lossless Transmission of Triangle Meshes" University of Southern California, Los Angeles, CA 195–202.

Chow "Optimized Geometry Compression for Real–time Rendering" Massachusetts Institute of Technology, Proceedings Visualization 1997, Oct. 19–24, 1997, Phoenix, AZ, 347–354.

Markosian "Real–Time Nonphotorealistic Rendering" Brown University site of the NSF Science and Technology Center for Computer Graphics and Scientific Visualization, Providence, RI.

Elber Line Art Rendering via a Coverage of Isoperimetric Curves, IEEE Transactions on Visualization and Computer Graphics, vol. 1, Department of Computer Science, Technion, Israel Institute of Technology, Haifa, Israel, Sep. 1995.

Zeleznik et al., "SKETCH: An interface for Sketching 3D Scenes"Brown University site of the NSF Science and Technology Center for Computer Graphics and Scientific Visualization, 1996.

Landsdown et al., "Expressive Rendering: A Review of Nonphotorealistic Techniques" IEEE Computer graphics and Applicatons, 29–37, 1995.

Raskar "Image Precision Silhouette Edges" University of North Carolina at Chapel Hill, Microsoft Research, 1999 Symposium on Interactive 3D Graphics Atlanta, GA, 135–231, 1999.

Ma et al., "Extracting Feature Lines for 3D Unstructured Grids" Institute for Computer Applications in Science and Engineering (ICASE), NASA Langley Research Center, Hampton, VA, IEEE, 1997.

Samet "Applications of spatial data structures: computer graphics, image processing, and GIS" University of Maryland, Addison–Wesley Publishing Company, 1060–1064, Reading, MA, Jun. 1990.

Dyn "A Butterfly Subdivision Scheme for Surface Interpolation with Tension Control" ACM Transactions on Graphics, vol. 9, No. 2, Apr. 1990.

Zorin "Interpolation Subdivision for Meshes With Arbitrary Topology" Department of Computer Science, California Institute of Technology, Pasadena, CA.

Heidmann, pp. 167–179.

* cited by examiner

REAL-TIME MULTI-RESOLUTION SHADOWS

TECHNICAL FIELD

This invention relates to generating a shadow in virtual three-dimensional (3D) space.

BACKGROUND

In 3D graphics processing, shadow generation techniques are used to provide real-life detail in a virtual 3D space. For example, a virtual 3D space may include a 3D object, a light source, and a surface. Positioning the 3D object between the light source and the surface results in the formation of a shadow of the object, on the surface, much the same as in the real world.

DESCRIPTION

Figure 1:
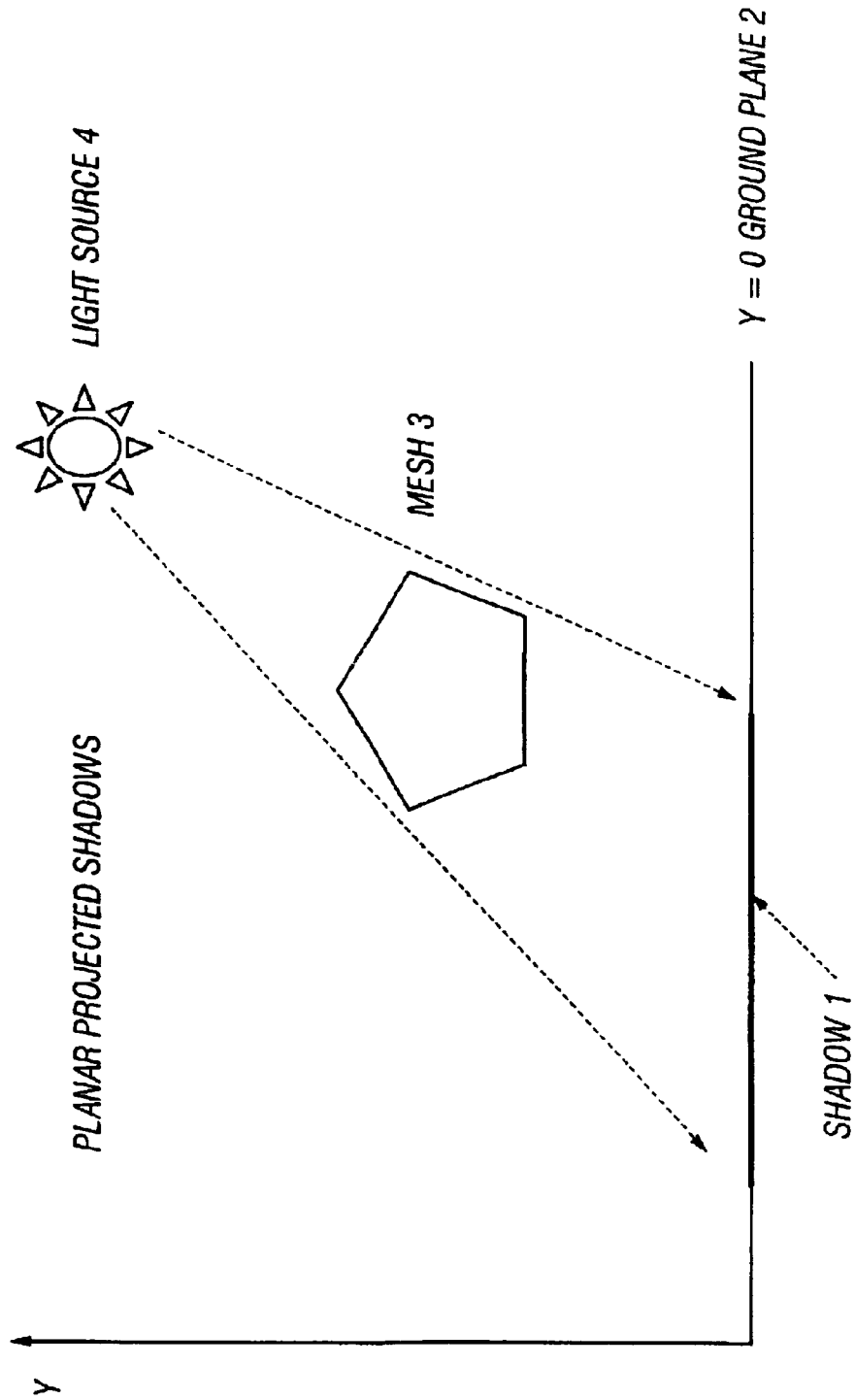
FIG. 1 is a view of a shadow projection in a virtual 3D space.

FIG. 1 shows a 3D model in a 3D space. The 3D space also includes light source 4. The combination of light source 4 and model 3 produces a shadow 1. That is, shadow 1 is cast onto ground plane 2 when model 3 is positioned between ground plane 2 and light source 4.

According to a technique known as the planar projected shadows technique, vertices of model 3 are projected on ground plane 2. When all of the vertices are projected onto ground plane 2, the shadow is at full resolution. Adding or removing vertices of model 3 changes the resolution of the shadow.

Figure 2A:
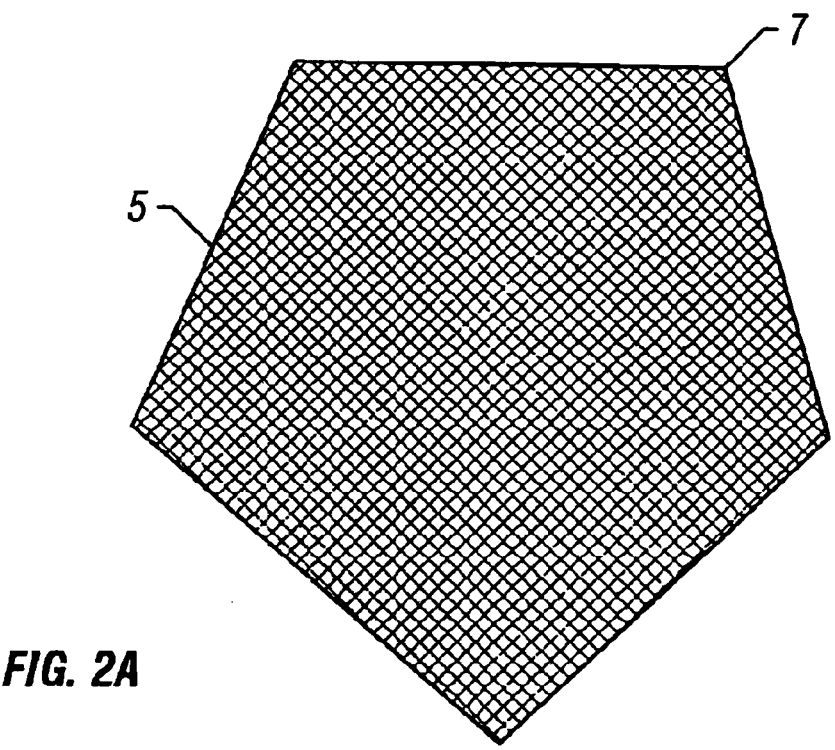
FIG. 2A is a view of a shadow at full resolution.
Figure 2B:
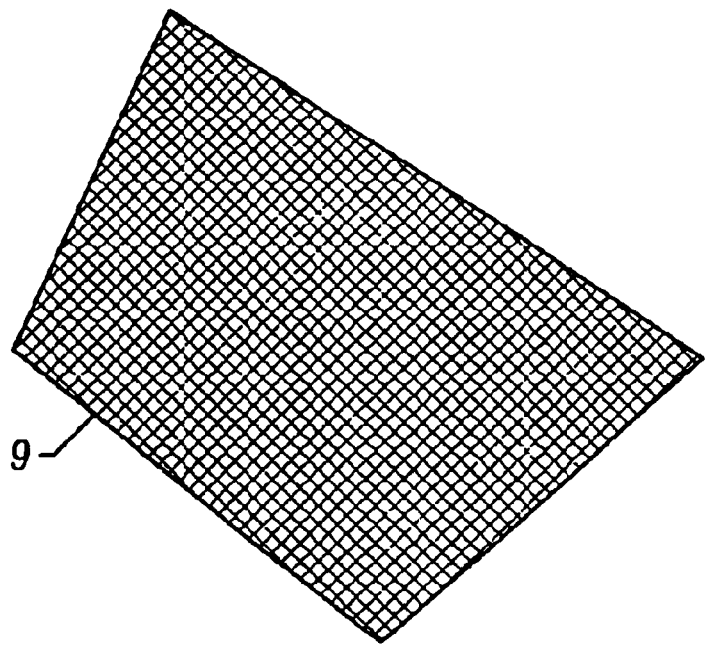
FIG. 2B is a view of a shadow at a reduced resolution.

For example, referring to FIGS. 2A and 2B, a full-resolution shadow 5 of model 3 has all of the vertices of model 3 projected onto the ground plane. By removing a vertex 7 from shadow 5, a lower resolution shadow 9 is projected. The ability to adjust the shadow resolution permits a central processing unit (CPU) to perform other tasks, therefore allowing low-end platforms to function as effectively as high-end platforms. While FIGS. 1, 2A and 2B reflect shadow resolution adjustment using the planer projected shadows technique, other techniques, such as the shadow volumes technique, can be used to reduce shadow resolution.

Figure 3:
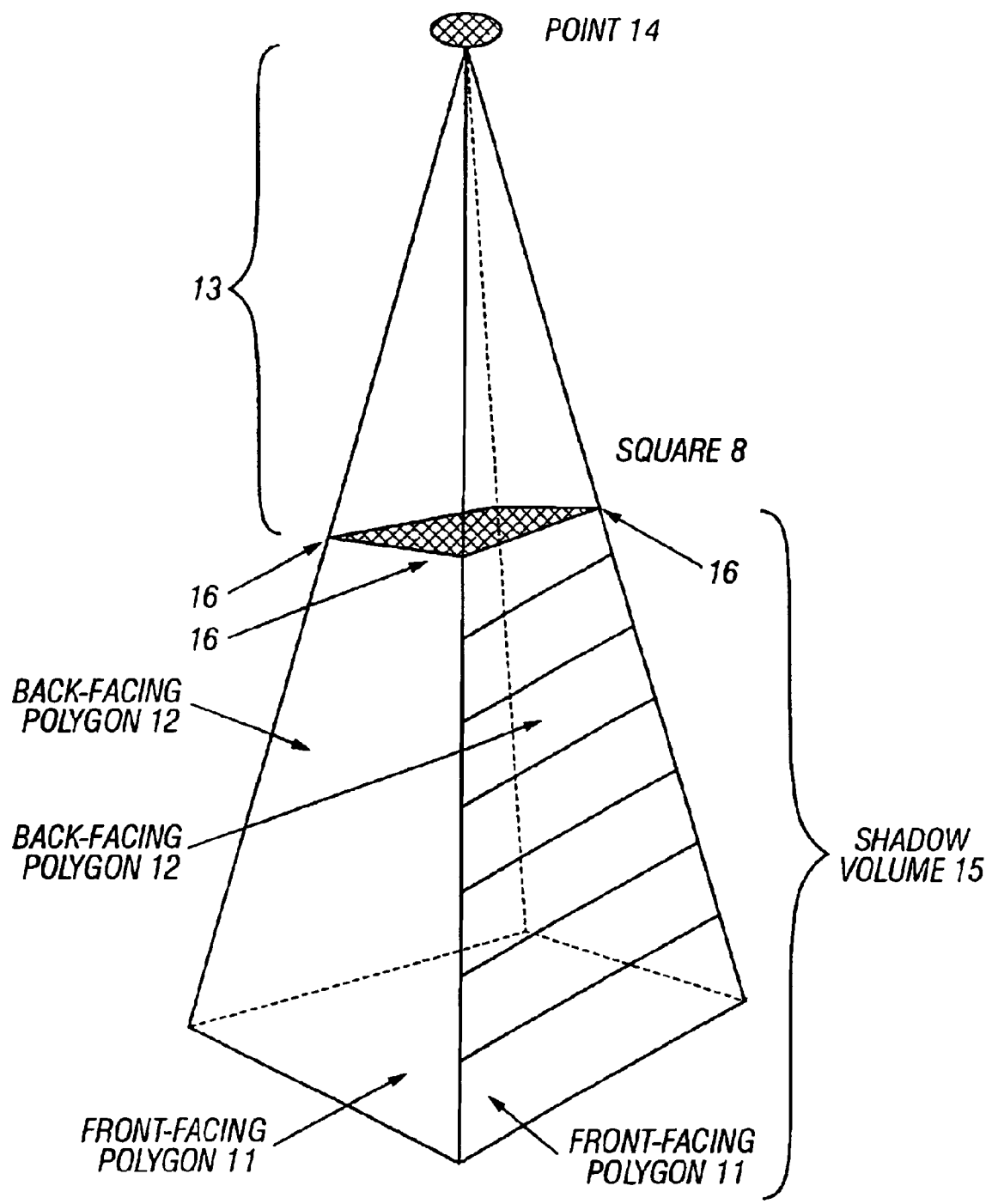
FIG. 3 is a view of a planar volumes shadow.

Referring to FIG. 3, in the shadow volumes technique, shadows are generated using volumes of shadow space. Consider a point 14 in space and a square 8. If lines are drawn that extend from point 14 to each of the vertices of square 8, the result would form a first volume in the shape of a square-based pyramid 13. If the lines continue beyond the vertices into infinity, they form a second volume below square 8, called a shadow volume 15. If point 14 is a light source, then every point in shadow volume 15 is in the shadow of square 8. The sides of shadow volume 15 visible to the viewer are called front-facing polygons 11, while the sides not visible to the viewer are called back-facing polygons 12. Thus, to reduce the resolution of a shadow using the shadow volumes technique, one or more polygons are removed.

Figure 4:
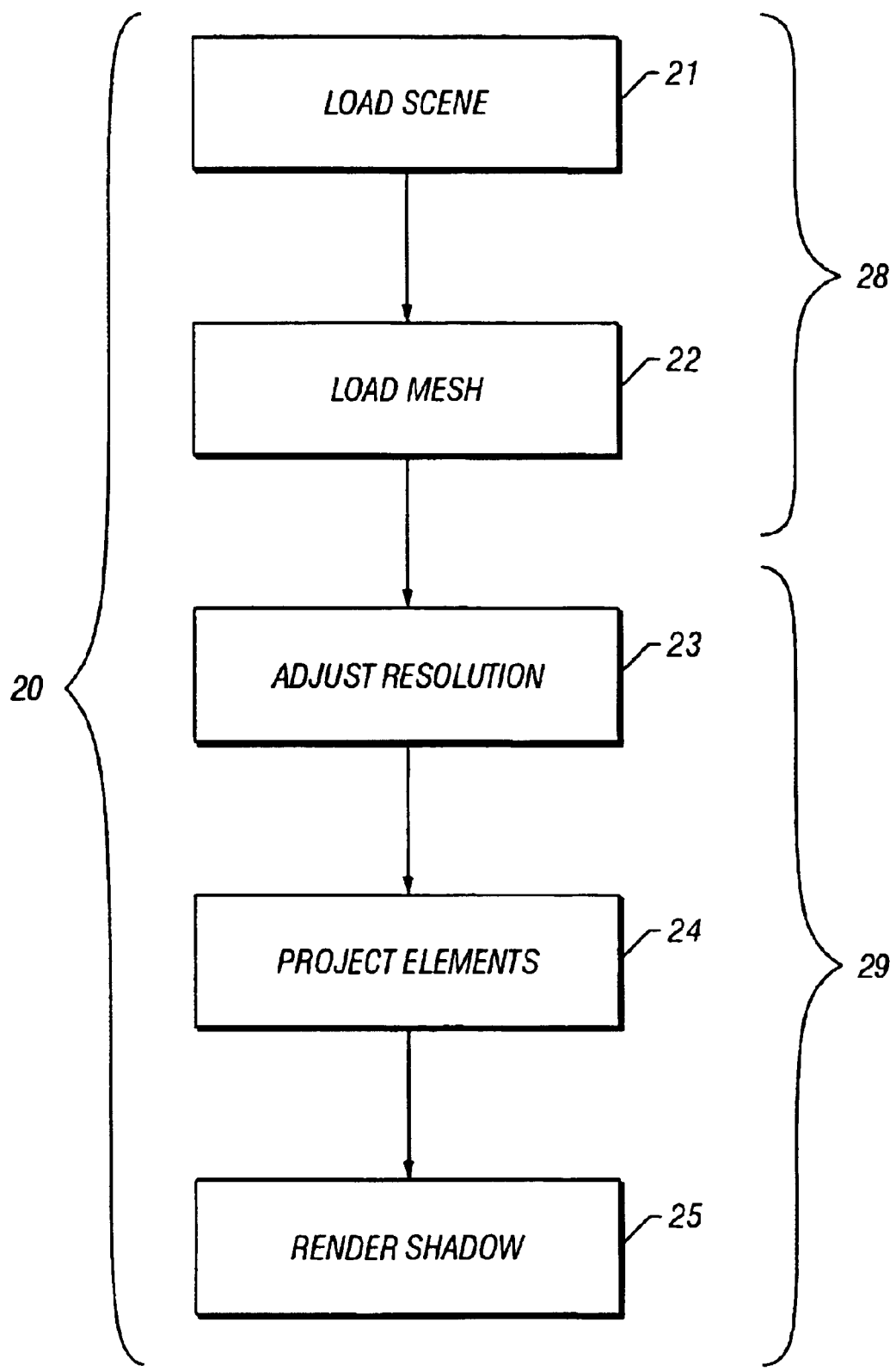
FIG. 4 is flowchart of a process for generating a shadow in 3D space.

Referring to FIG. 4, a process 20 is shown for generating multi-resolution shadows in a 3D space. Briefly, process 20 starts with the highest quality model and then allows a runtime library to reduce the model. The runtime library is a library of routines that are bound to a program while it is executing. In terms of the planar projected shadows technique, the reduction is made vertex-by-vertex until there are no vertices left. Each level of reduction in the model removes a vertex that causes the least amount of error to the original model. Statistical techniques can be used to determine which vertices to remove.

In other words, model 3 is changed to the desired level of shadow resolution. Each vertex of the changed model is projected on to ground plane 2, shadow 1 is rendered, and the original model 3 is rendered.

Figure 5:
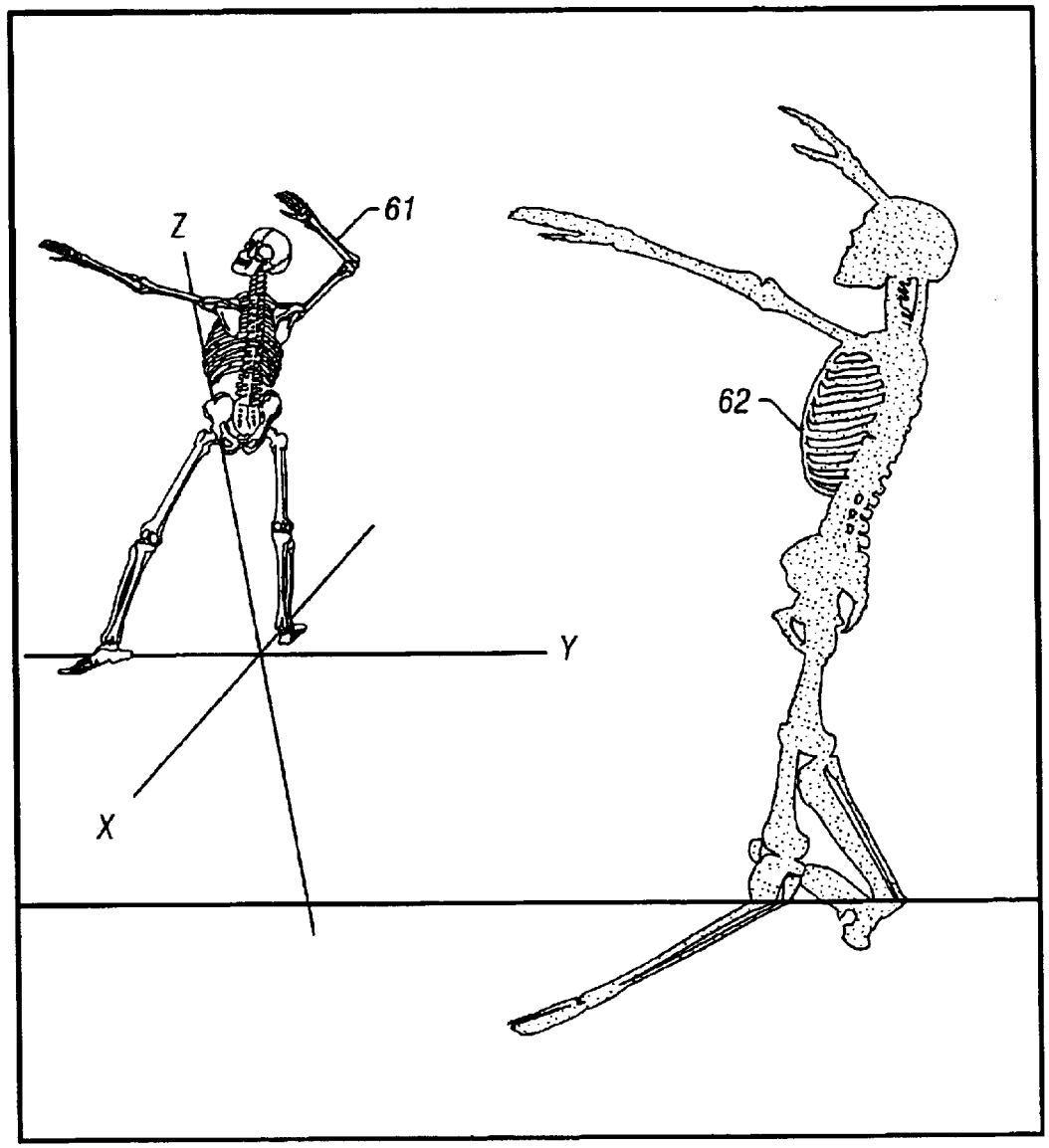
FIG. 5 is a view of an object and a shadow at 30% reduced resolution.

The effective result of process 20 is shown in FIG. 5. Skeleton model 61 is a model. After the shadow resolution has been adjusted using process 20, a skeleton shadow 62 is depicted having a 30% resolution of skeleton model 61.

In more detail, process 20 has two phases: a load-time phase 28 and a run-time phase 29. In load-time phase 28, process 20 loads (21) a 3D scene, including light sources, cameras, walls and other surfaces. The 3D model 3 is loaded as a multi-resolution model (MRM). An MRM is a 3D model that is capable of being depicted in one of a multiple of resolutions.

Process 20 loads (22) MRM updates for the model. The MRM updates are the changes to the resolution of the shadow. The MRM updates can be provided by another application program optimizing system resource allocations or from the system's internal resource management.

Figure 6:
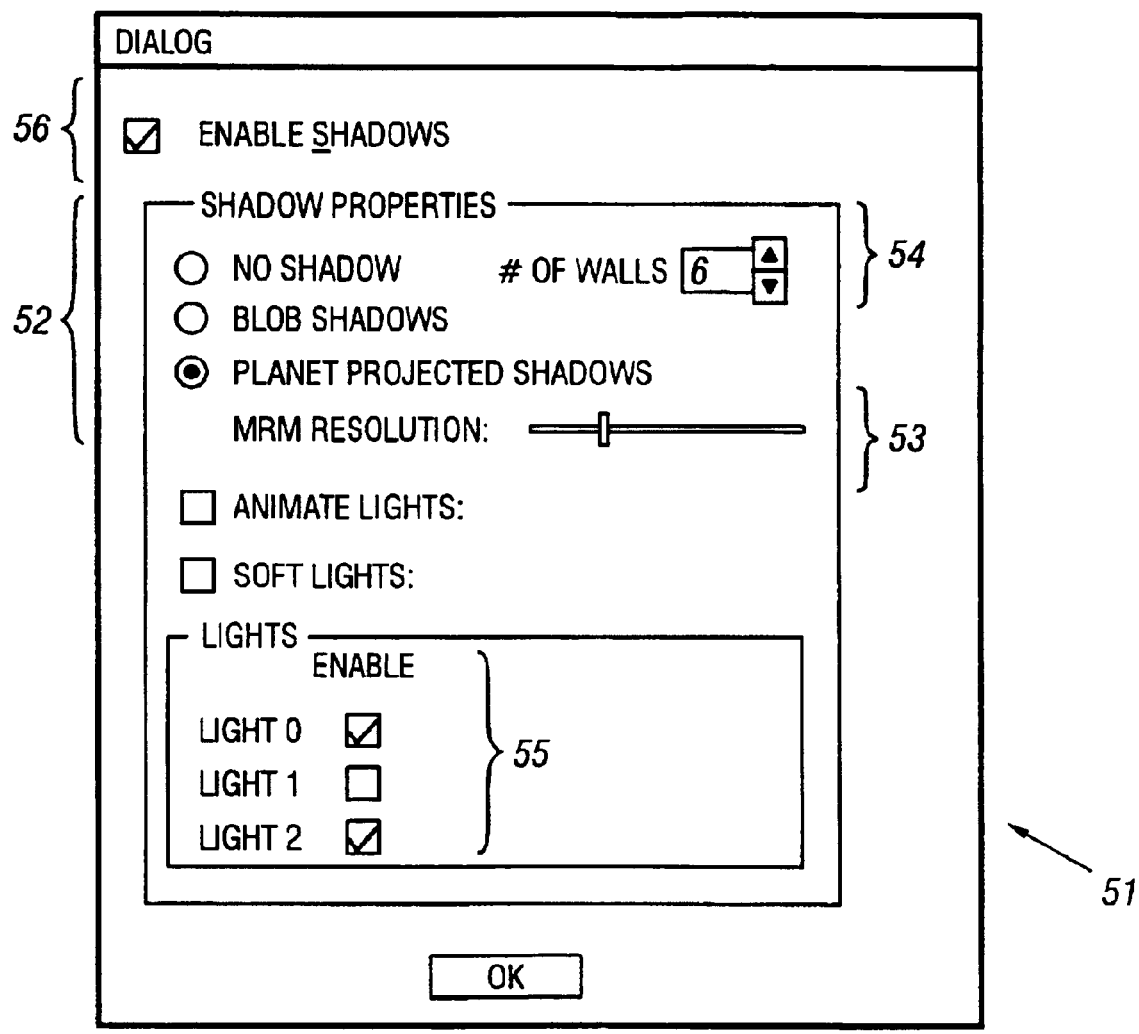
FIG. 6 is a user display for adjusting shadow resolution.

Referring to FIG. 6, updates may be also made by a user through a dialog box 51 that can customize the shadow generation and appearance. In this example, the user has a choice to use shadow resolution adjustment by checking an enable shadows box 56. If the user elects to enable shadow adjustment, the user can further choose from a shadow properties list 52 to have no shadows, blob shadows, or planar projected shadows. Blob shadows are shadows that have a low resolution relative to model 3 (e.g., 5 to 20% resolution) and can be displayed as merely ovals or blobs. For example, early cartoons depicted a cartoon character's shadows as black ovals that would follow the character across the screen.

If the user checks planar projected shadows, the user may indirectly adjust the number of vertices that are removed by process 20 by moving sliding bar 53. Moving sliding bar 53 to the left reduces the shadow resolution by reducing the number of vertices in the 3D model, while moving slide bar 53 to the right increases the shadow resolution by increasing the number of vertices in the 3D model. Other user customization includes a walls box 54 to select the number of walls shadows can appear and a light list 55 to check which light sources should be active to generate shadows in the scene.

In run-time phase 29, process 20 adjusts (23) the resolution of the MRM to the desired shadow resolution generated in the MRM updates. As explained above, shadow adjustment is accomplished differently depending on the techniques chosen for shadow resolution. For the planar shadows technique, adjustments are made to the shadow resolution by adding or subtracting vertices. In the shadow volumes technique, adjustments are made to shadow resolution by adding or deleting polygons. This is accomplished optimally by limiting the number of polygons in the MRM first by generating only shadow volumes from silhouette edges. A silhouette edge is an edge of the object where one polygon faces towards the light and the other edge faces away from the light. Therefore, whether the element is a vertex or a polygon, or another type of element, process 20 adjusts the resolution by removing elements from the MRM.

Process 20 projects (24) the elements of the MRM onto one or more surfaces. For example, in a planar projected shadows technique, the vertices of the reduced model are projected onto one or more surfaces.

Figure 7:
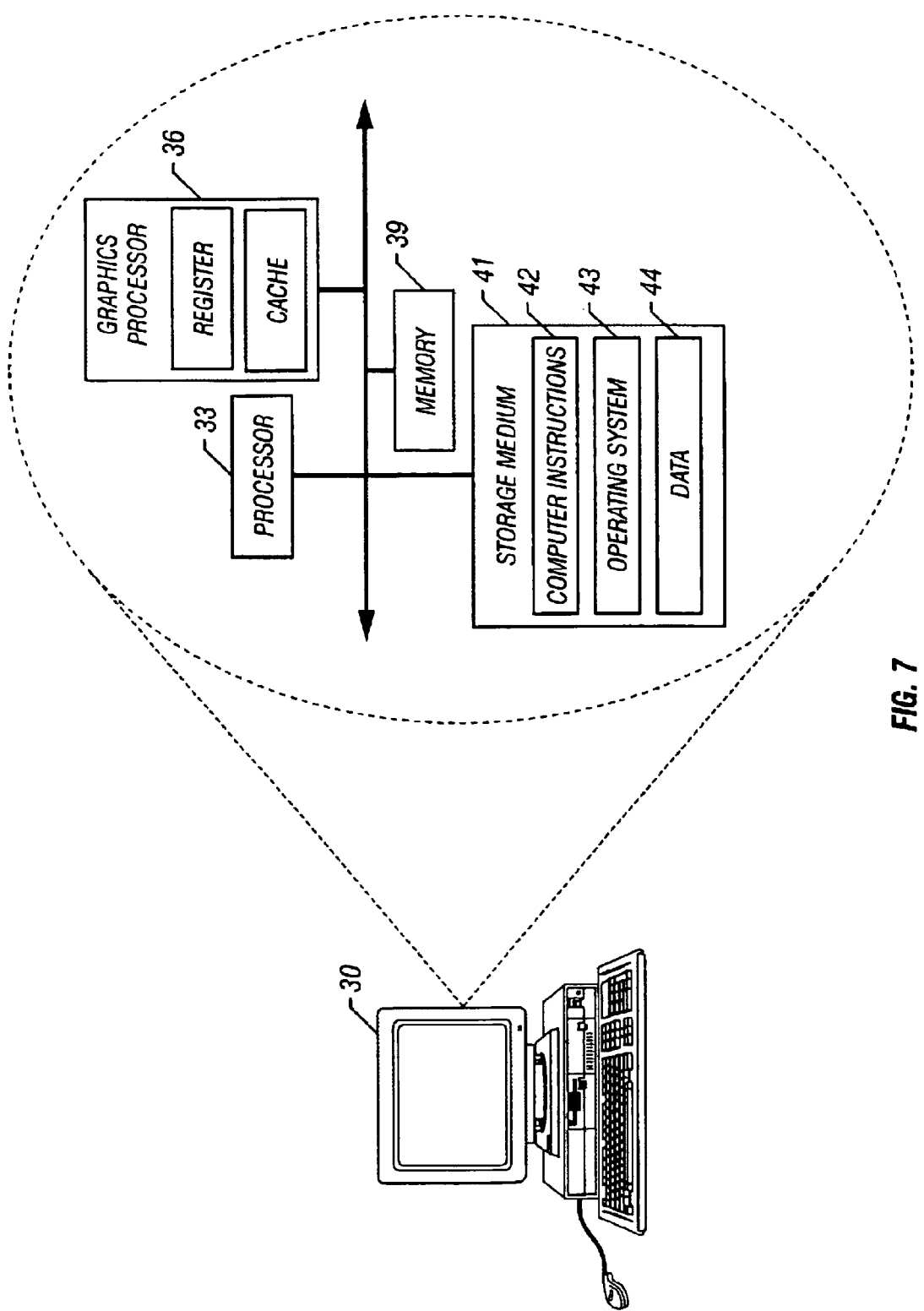
FIG. 7 is a block diagram of a computer system on which the process of FIG. 4 may be implemented.

Process 20 renders (25) the shadow for display using one or more techniques. For instance, using a planar projected shadows technique, the vertices of the shadow are rendered for each light source in the scene. For example, a shadow with an adjusted resolution is generated on one or more surfaces based on a first light source. A second shadow is generated on one or more surfaces based on a second light source. Subsequent shadows are generated for each of the remaining light sources. Other techniques for rendering shadows include using shadow volumes with a stencil buffer. In this example, the shadow is rendered once using the front-facing polygons and rendered once with back-facing polygons Process 20 also renders the 3D model at its original resolution. The 3D model may be rendered either before, during or after shadow rendering. FIG. 7 shows a computer 30 for rendering shadows using process 20. Computer 30 includes a processor 33, a memory 39, a storage medium 41 (e.g., hard disk), and a 3D graphics processor 41 for processing data in the virtual 3D space of FIGS. 1 to 6. Storage medium 41 stores 3D data 44 which defines the 3D space, and computer instructions 42 which are executed by processor 33 out of memory 39 to render shadows using process 20.

Process 20 is not limited to use with the hardware and software of FIG. 7; it may find applicability in any computing or processing environment and with any type of machine that is capable of running a computer program. Process 20 may be implemented in hardware, software, or a combination of the two. Process 20 may be implemented in computer programs executed on programmable computers/machines that each include a processor, a storage medium/article readable by the processor (including volatile and nonvolatile memory and/or storage elements), at least one input device, and one or more output devices. Program code maybe applied to data entered using an input device to perform process 20 and to generate output information.

Each such program may be implemented in a high level procedural or objected-oriented programming language to communicate with a computer system. However, the programs can be implemented in assembly or machine language. The language may be a compiled or an interpreted language. Each computer program may be stored on a storage medium or device (e.g., CD-ROM, hard disk, or magnetic diskette) that is readable by a general or special purpose programmable computer for configuring and operating the computer when the storage medium or device is read by the computer to perform process 20. Process 20 may also be implemented as a machine-readable storage medium, configured with a computer program, where upon execution, instructions in the computer program cause the computer to operate in accordance with process 20.

The invention is not limited to the specific embodiments described herein. For example, the invention can be used with any shadow rendering technique. The invention is also not limited to use in 3D space, but rather can be used in N-dimensional space (N≧3). The invention is not limited to the specific processing order of FIG. 4. Rather, the specific blocks of FIG. 4 may be re-ordered, as necessary, to achieve the results set forth above.

Other embodiments not described herein are also within the scope of the following claims

What is claimed is:

1. A method of generating a shadow in a virtual three-dimensional (3D) space, comprising:
   adjusting a resolution of a 3D model;
   projecting elements of the 3D model onto a surface in the virtual 3D space; and
   rendering a shadow having the adjusted resolution of the 3D model on the surface using the projected element while concurrently rendering the 3D model at a resolution that is higher than the adjusted resolution.

2. The method of claim 1, wherein the elements of the 3D model are projected based on a location of a virtual light source in the virtual 3D space.

3. The method of claim 2, wherein the virtual 3D space includes a second virtual light source; and
   the method further comprises:
   adjusting the resolution of the 3D model to a second resolution;
   projecting elements of the 3D model onto a second surface in the virtual 3D space based on a location of the second virtual light source; and
   rendering a second shadow having the second resolution on the second surface using the elements projected on the second surface.

4. The method of claim 1, wherein adjusting comprises reducing the resolution of the 3D model.

5. The method of claim 4, wherein adjusting comprises removing elements of the 3D model.

6. The method of claim 5, wherein the 3D model comprises a multi-resolution model.

7. The method of claim 1, further comprising: providing a user interface for use in adjusting the resolution of the 3D model.

8. The method of claim 1, wherein the elements comprise vertices of the 3D model.

9. The method of claim 1 wherein the elements comprise polygons of the 3D model.

10. An apparatus for generating a shadow in a virtual three-dimensional (3D) space, comprising:
    a memory that stores executable instructions; and
    a processor that executes the instructions to:
    adjust a resolution of a 3D model,
    project elements of the 3D model onto a surface in the virtual 3D space;
    render a shadow having the adjusted resolution of the 3D model on the surface using the projected elements while concurrently rendering the 3D model at a resolution that is higher than the adjusted resolution.

11. The apparatus of claim 10, wherein the elements of the 3D model are projected based on a location of a virtual light source in the virtual 3D space.

12. The apparatus of claim 11, wherein the virtual 3D space includes a second virtual light source and the processor executes instructions to:
    adjust the resolution of the 3D model to a second resolution;
    project elements of the 3D model onto a second surface in the virtual 3D space based on a location of the second virtual light source; and render a second shadow having the second resolution on the second surface using the elements projected on the second surface.

13. The apparatus of claim 10, wherein adjusting comprises reducing the resolution of the 3D modal.

14. The apparatus of claim 13, wherein adjusting comprises removing elements of the 3D model.

15. The apparatus of claim 14, wherein the 3D mode comprises a multi-resolution model.

16. The apparatus of claim 10, wherein the processor executes instructions to provide a user interface for use in adjusting the resolution of the 3D model.

17. The apparatus of claim 10, wherein the elements comprise vertices of the 3D model.

18. The apparatus of claim 10, wherein the elements comprise polygons of the 3D model.

19. An article comprising a machine-readable medium that stores executable instructions for selecting a target object in virtual three-dimensional (3D) space, the instructions causing a machine to:

adjust a resolution of a 3D model;

project elements of the 3D model onto a surface in the virtual 3D space; and render a shadow having the adjusted resolution of the 3D model on the surface using the projected element while concurrently rendering the 3D model at a resolution that is higher than the adjusted resolution.

20. The article of claim 19, wherein the elements of the 3D model are projected based on a location of a virtual light source in the virtual 3D space.

21. The article of claim 20, wherein the virtual 3D space includes a second virtual light source and the article further comprises instructions that cause the machine to:

adjust the resolution of the 3D model to a second resolution;

project elements of the 3D model onto a second surface in the virtual 3D space based on a location of the second virtual light source; and render a second shadow having the second resolution on the second surface using the elements projected on the second surface.

22. The article of claim 19, wherein adjusting comprises reducing the resolution of the 3D model.

23. The article of claim 22, wherein adjusting comprises removing elements of the 3D model.

24. The article of claim 23, wherein the 3D model comprises a multi-resolution model.

25. The article of claim 19, further comprising instructions that cause the machine to provide a user interface for use in adjusting the resolution of the 3D model.

26. The article of claim 19, wherein the elements comprise vertices of the 3D model.

27. The article of claim 19, wherein the elements comprise polygons of the 3D model.

* * * * *